Oct. 4, 1932.  M. E. WOOD  1,880,640
MOUSE AND RAT TRAP
Filed June 24, 1931
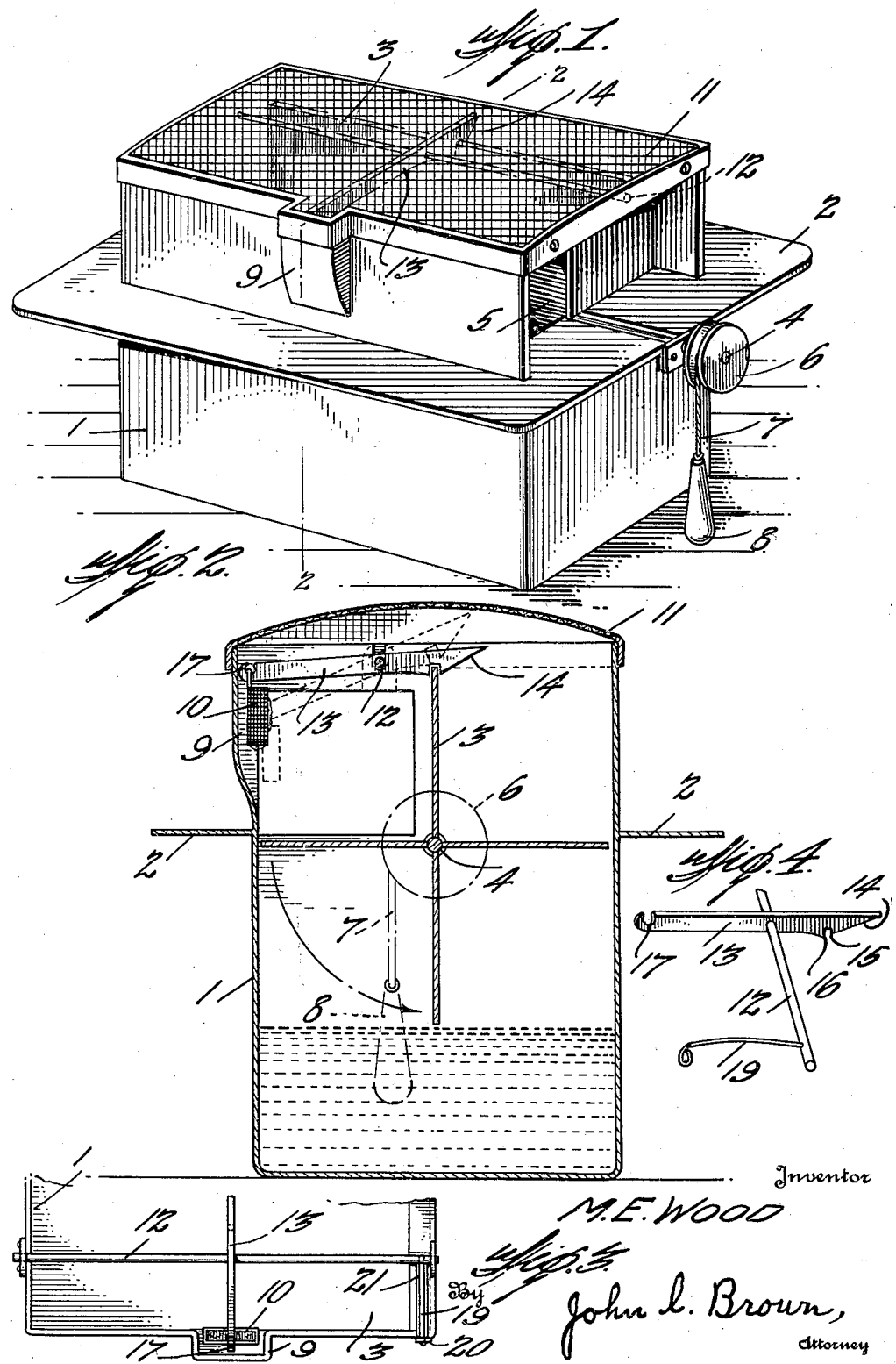
Inventor
M. E. WOOD
By John L. Brown,
Attorney Patented Oct. 4, 1932

1,880,640

UNITED STATES PATENT OFFICE

MARVIN E. WOOD, OF STONE MOUNTAIN, VIRGINIA

MOUSE AND RAT TRAP

Application filed June 24, 1931. Serial No. 546,623.

This invention relates to improvements in animal traps, and more particularly to an improved form of mouse or rat trap, which if made in the proper size may be equally well used to trap other animals.

An object of the invention is to provide an improved mouse or rat trap which will be so constructed that when the animal steps on the rotatable platform and attempts to take the bait from the bait holder, a trigger will be released whereupon the rotatable platform will be caused to rotate a quarter of a revolution due to a weight secured by a cord wound around the platform axle, and the animal will be dropped and knocked into a receptacle positioned below the platform, the said receptacle being partially filled with water to drown the animal when it drops into the same.

Another object of the invention is to provide an improved form of animal trap which will be positioned on top of a water container, and will be constructed with four platforms extending radially from a common axle mounted transversely above the water container, the outer edges of said platforms being adapted to be consecutively engaged by a spring tensioned trigger mechanism whenever the trigger is tripped, so that the trap will be both self set and ever set.

A further object of the invention is to provide an improved form of rotatable platform mouse and rat trap, which will be provided with a pivoted trigger engageable at one end with the outer ends of the platform, and which will removably support a bait holding container at its opposite end, said container being so constructed that the animal will be prevented from getting the bait, but may smell and touch the same with its claws but can not remove the bait from the container.

Other objects will appear as the description proceeds.

In the accompanying drawing which forms a part of my application,

Figure 1 is a perspective view of my improved mouse and rat trap;

Figure 2 is a sectional view taken on the line 2—2 of Figure 1;

Figure 3 is a plan view looking down on the trigger mechanism, and

Figure 4 is a perspective view of the trigger and resilient tensioning spring used in connection therewith.

Like characters of reference are used throughout the following specification and the accompanying drawing to designate corresponding parts.

In carrying out my invention, I provide a suitable container 1 in which I place a quantity of water, the upper end or portion forming a housing for the trap mechanism. A platform 2 is disposed about the container 1 some distance from the bottom thereof. A rotatable paddle wheel 3 is supported upon the axle 4 and extends within the container 1 and longitudinally of the same, with the lowermost portions of the paddles a slight distance above the surface of the water in the container. I prefer to have four paddles arranged in equal spaced relation about the axle 4 and extending radially therefrom.

Alined openings 5 are formed in the opposite ends of the container 1 adjacent the upper portion thereof, and are so disposed that a mouse can jump on to the platform 2 and walk directly into either opening on to the paddle which will normally lie in a horizontal plane between the said openings and at the bottoms thereof. A pulley 6 will be fixed on the outer end of the axle 4, and will carry a cord 7 which in turn supports the weight 8, the said cord being adapted to be wound on the pulley.

A portion of the upper side wall of the container 1 is formed into an outwardly extending guide channel 9, as clearly illustrated in Figure 1 of the drawing, and serves to provide a restricted passageway for the movement of the bait holding receptacle 10 to make it more difficult for the mouse or rat to obtain the bait.

A removable screened cover 11 closes the top of the container 1, and is so made that the mouse or rat may see the bait in the bait holding receptacle positioned immediately below the said cover, and not being able to get to it, will seek another way to reach it, and will consequently enter one of the openings 5.

My improved trigger mechanism comprises a bearing shaft 12 mounted between the opposite ends of the container 1 a slight distance above the upper limits of the paddle-wheel 3, and in parallel relation with the said wheel. The trigger 13 is fixed to the shaft 12, and extends in opposite directions therefrom, one end being formed into a cam surface 14 terminating in the locking notch 15 and retaining shoulder 16, while the opposite end of the trigger is formed into a hook 17 and is adapted to removably support the bait basket or receptacle 10, the same being movable in the guide groove or channel 9. A tensioning spring 19 is secured to the shaft 12 and to a stud 20 on the container 1, the spring being adapted to lie in the groove 21, and to normally exert a tension of the shaft 12 so that the trigger notch 15 will normally be in engagement with one of the vanes of the paddle wheel 3, and under tension of the weight 8.

From the foregoing description, it will be apparent that the mode of operation of my improved mouse and rat trap will be as follows: The trigger mechanism will be normally engaged with one of the vanes of the rotating platform and thus held against the pressure of the weight. A mouse or rat will get on the platform and will enter by one of the openings at the end of the container or housing, and will walk on the vane of the platform which is then extending horizontally between the two openings, and when he reaches the bait container will pull down on the same in the attempt to get the bait, whereupon the trigger will be released, and the weight will rotate the platform a quarter of a turn, thereby dropping the animal into the water in the bottom of the container where he will be drowned. The upright vane adjacent the horizontal vane will then be in the position between the openings and the spring on the platform axle will force the trigger into engagement with the next adjacent vane, and the trap will be again reset, as often as it is operated by an animal. The speed with which the trap operates will at times cause the animal to be struck and knocked down into the water in the container.

Many minor changes in detail of construction may be resorted to without departure from the spirit of the invention.

Having thus described my invention what I claim and desire to secure by Letters Patent of the United States is:

An animal trap comprising a container adapted to receive a quantity of water, a platform surrounding said container adjacent the top thereof, a rotatable paddle wheel mounted in said container longitudinally thereof, means for rotating said paddle wheel, alined openings in the opposite ends of said container opposite a horizontal vane of said paddle wheel, a shaft mounted in said container and extending parallel with the paddle wheel, a trigger mounted upon said shaft formed with a vane engaging notch at one end and with a hook support at its opposite end, a bait container guide channel formed in said container body adjacent said hook support, an enclosed bait container removably supported upon said hook support and movable in said guide channel, and resiliently tensioned means carried by the shaft and engageable with the container for normally forcing the trigger notch into engagement with the next adjacent vane of the paddle wheel after the trap is sprung.

In testimony whereof I affix my signature.

MARVIN E. WOOD.